United States Patent
Brosnan

(10) Patent No.: US 8,164,569 B2
(45) Date of Patent: Apr. 24, 2012

(54) OFFSET ILLUMINATION APERTURE FOR OPTICAL NAVIGATION INPUT DEVICE

(75) Inventor: Michael John Brosnan, Fremont, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 597 days.

(21) Appl. No.: 12/357,611

(22) Filed: Jan. 22, 2009

(65) Prior Publication Data
US 2010/0182601 A1 Jul. 22, 2010

(51) Int. Cl.
*G06F 3/033* (2006.01)
(52) U.S. Cl. ........................................ 345/166
(58) Field of Classification Search ............... None
See application file for complete search history.

(56) References Cited

U.S. PATENT DOCUMENTS

| | | | |
|---|---|---|---|
| 3,716,286 A * | 2/1973 | St. John et al. | 359/3 |
| 7,418,016 B2 | 8/2008 | Gruhlke et al. | |
| 2007/0139659 A1 * | 6/2007 | Hwang et al. | 356/614 |
| 2007/0181785 A1 | 8/2007 | Helbing et al. | |
| 2007/0215793 A1 | 9/2007 | Gruhlke et al. | |
| 2008/0117170 A1 | 5/2008 | Lutian | |
| 2008/0204761 A1 | 8/2008 | Itagaki | |
| 2009/0108175 A1 * | 4/2009 | Grot | 250/206.1 |

* cited by examiner

*Primary Examiner* — Christopher R Lamb

(57) ABSTRACT

An optical navigation input device with an offset imaging aperture. The optical navigation input device includes a light source, an illumination aperture structure, and an image sensor. The light source directs a light beam toward a substantially specular illumination surface. Scattered light reflects off of a surface reflection feature along a scattered light path which is offset from a specular reflection path. The illumination aperture structure at least partially defines an illumination aperture interposed between the light source and the illumination surface. The illumination aperture produces a diffraction pattern that includes a diffraction discontinuity which is substantially free from diffracted light within a sector area outside of the light beam. The image sensor is disposed within the scattered light path at a location corresponding to the diffraction discontinuity. The image sensor receives the scattered light from the surface reflection feature and generates a navigation image of the surface reflection feature.

20 Claims, 7 Drawing Sheets

190

192
Emit a light beam through an asymmetrical clipping aperture at least partially defined by an illumination aperture structure so that the illumination aperture structure clips the light beam and produces a diffraction pattern which includes a diffraction discontinuity 194
Pass scattered light through an imaging aperture defined by an imaging aperture structure at a location corresponding to the diffraction discontinuity to receive scattered light substantially outside of a specular reflection path 196
Generate a navigation image based on the scattered light

FIG. 8

OFFSET ILLUMINATION APERTURE FOR OPTICAL NAVIGATION INPUT DEVICE

BACKGROUND

There is a relatively new class of optical mice and other optical navigation input devices for computing applications. These optical devices facilitate tracking input movements on specular navigation surfaces such as glass tabletops which do not have substantial texture for imaging. In general, these optical navigation input devices rely on light scattered by small particles and scratches. This scattered light slightly increases the angular range of the otherwise collimated specular reflection off the glass surface. By capturing the scattered light off axis of the reflected beam using an offset imaging aperture (i.e., the imaging aperture is offset relative to the main intensity of the specular reflection of the incident light), images of such scattering sites can be projected on a pixel array in a sensor, which can then be used to determine the motion of the mouse relative to the tabletop.

One challenge to implementing a compact version of such a system is that light from the tails of the Gaussian beam can enter the imaging aperture and overwhelm the signal from surface scattering features. In other words, the peripheral light distribution around the main intensity of the reflected light can have a higher intensity than the intensity of the scattered light. For example, if a Gaussian beam with a diameter of 1.2 mm at the $1/e^2$ intensity points intersects a plane of an imaging aperture with a diameter of 0.8 mm, with a beam center to imaging aperture center offset of 1.5 mm, approximately $1/10,000$ of the beam power will pass through the offset imaging aperture. At the edge of the offset imaging aperture, the intensity of the light will be approximately $1/1,000$ of the intensity of the center of the beam. Although the intensity of the light at the imaging aperture is much less than the intensity of the light at the beam center, in this example, the intensity of the light at the imaging aperture is nevertheless at least two orders of magnitude too high for adequate detection of the relatively low intensity of the light scattered from features on the glass surface.

One way to reduce the intensity of the light leakage through the imaging aperture is to place a circular illumination aperture around the collimated laser beam as it leaves the optical source. In this configuration, the collimated light passes through the illumination aperture prior to illuminating the navigation surface. This truncates the Gaussian beam so that there is no light beyond a certain radius from the beam center. Unfortunately, diffraction at the illumination aperture causes the beam to diffract outwards as the beam propagates toward the navigation surface and reflects towards the plane of the imaging aperture. The intensity of the diffracted light varies based on the size of the illumination aperture. In one example, it may be possible to optimize the illumination aperture size (e.g., about 1.0 mm) for a specific configuration, based on the tradeoff between beam growth due to diffraction and the native intensity of the tails of the Gaussian beam. However, even using an optimized radius for a circular illumination aperture, the amount of power entering the imaging aperture (e.g., about 6 nW per 1 mW beam) can still be at least one order of magnitude too high.

Another possible approach to address this problem is to make the optical system larger, which allows more linear distance between the center of the reflected light beam and the center of the imaging aperture center, while still detecting light from the same angle relative to beam axis. However, making the optical system larger would result in making the computer mice and other optical navigation input devices larger. Larger devices are often less maneuverable and less portable.

SUMMARY

Embodiments of an optical navigation input device (NID) are described. In one embodiment, the optical navigation input device includes a light source, an illumination aperture structure, and an image sensor. The light source directs a light beam toward a substantially specular illumination surface to illuminate a primary illumination spot at the illumination surface. The light beam reflects off of the illumination surface along a specular reflection path. Scattered light reflects off of a surface reflection feature along a scattered light path which is offset from the specular reflection path. The illumination aperture structure at least partially defines an illumination aperture interposed between the light source and the illumination surface. The illumination aperture produces a diffraction pattern relative to the light beam. The diffraction pattern includes a diffraction discontinuity which is substantially free from diffracted light within a sector area outside of the light beam. The image sensor is disposed within the scattered light path at a location corresponding to the diffraction discontinuity. The image sensor receives the scattered light from the surface reflection feature and generates a navigation image of the surface reflection feature.

In another embodiment, the optical navigation input device includes the light source, the imaging aperture structure, and the illumination aperture structure. In this embodiment, the light source directs the light beam toward the substantially specular illumination surface, and the light beam reflects off of the illumination surface along a specular reflection path. Also, scattered light reflects off of a surface reflection feature along a scattered light path which is offset from the specular reflection path. The imaging aperture structure defines an imaging aperture disposed within the scattered light path. The imaging aperture receives the scattered light from the surface reflection feature and directs at least a portion of the scattered light to an image sensor. The illumination aperture structure at least partially defines an illumination aperture interposed between the light source and the illumination surface. The illumination aperture structure is offset relative to the light beam to clip the light beam and produce a diffraction pattern which is substantially directed away from the imaging aperture. Other embodiments of the optical navigation input device are also described.

Embodiments of a method are also described. In one embodiment, the method is a method for operating an optical navigation input device. An embodiment of the method includes emitting a light beam through an asymmetrical clipping aperture at least partially defined by an illumination aperture structure. The portion of the light beam that passes through the asymmetrical clipping aperture illuminates an illumination surface. The illumination aperture structure clips the light beam and produces a diffraction pattern. The diffraction pattern includes a diffraction discontinuity which is substantially free from diffracted light within a sector area outside of the light beam. The method also includes passing scattered light through an imaging aperture defined by an imaging aperture structure. The imaging aperture structure defines the imaging aperture at a location corresponding to the diffraction discontinuity to receive scattered light substantially outside of a specular reflection path. The method also includes generating a navigation image based on the scattered light. Other embodiments of the method are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

FIG. 8 depicts a schematic flow chart diagram of one embodiment of a method for making an optical navigation input device.

Throughout the description, similar reference numbers may be used to identify similar elements.

DETAILED DESCRIPTION

While many embodiments are described herein, at least some of the described embodiments utilize an offset illumination aperture to partially clip an incident light beam and produce a diffraction pattern which directs diffracted light away from an imaging aperture. More specifically, the illumination aperture is offset relative to the light beam so that the light beam is not centered within the illumination aperture and, hence, at least a portion of the light beam is clipped and does not pass through the illumination aperture. In some embodiments, at least two sides of the light beam are clipped by the illumination aperture in a manner to produce a diffraction discontinuity in which there is a relatively small amount of diffracted light.

Embodiments of the offset illumination aperture may be implemented in laser mice or other optical navigation input devices. In particular, embodiments of the offset illumination aperture may be used in compact optical navigation input devices to track movements on glass or other smooth surfaces. Compared with conventional tracking technologies for smooth surfaces, the tails of the Gaussian distribution of the primary light beam can be suppressed by shaping the diffraction based on the shape and location of the aperture relative to the shape and location of the light beam from the light source.

In some embodiments, the corner of a large offset square or diamond shaped illumination aperture is used to clip one or more sides of the light beam. The location and orientation of the corner of the illumination aperture coordinates with the location of the imaging aperture. Specifically, in some embodiments, the illumination aperture is rotated so that diffraction, from the straight edges that form the corner, is directed away from the imaging aperture. This configuration may allow a much better tradeoff between blocking the tails of the Gaussian intensity profile and diffraction of light through the illumination aperture, compared with conventional configurations.

Figure 1:
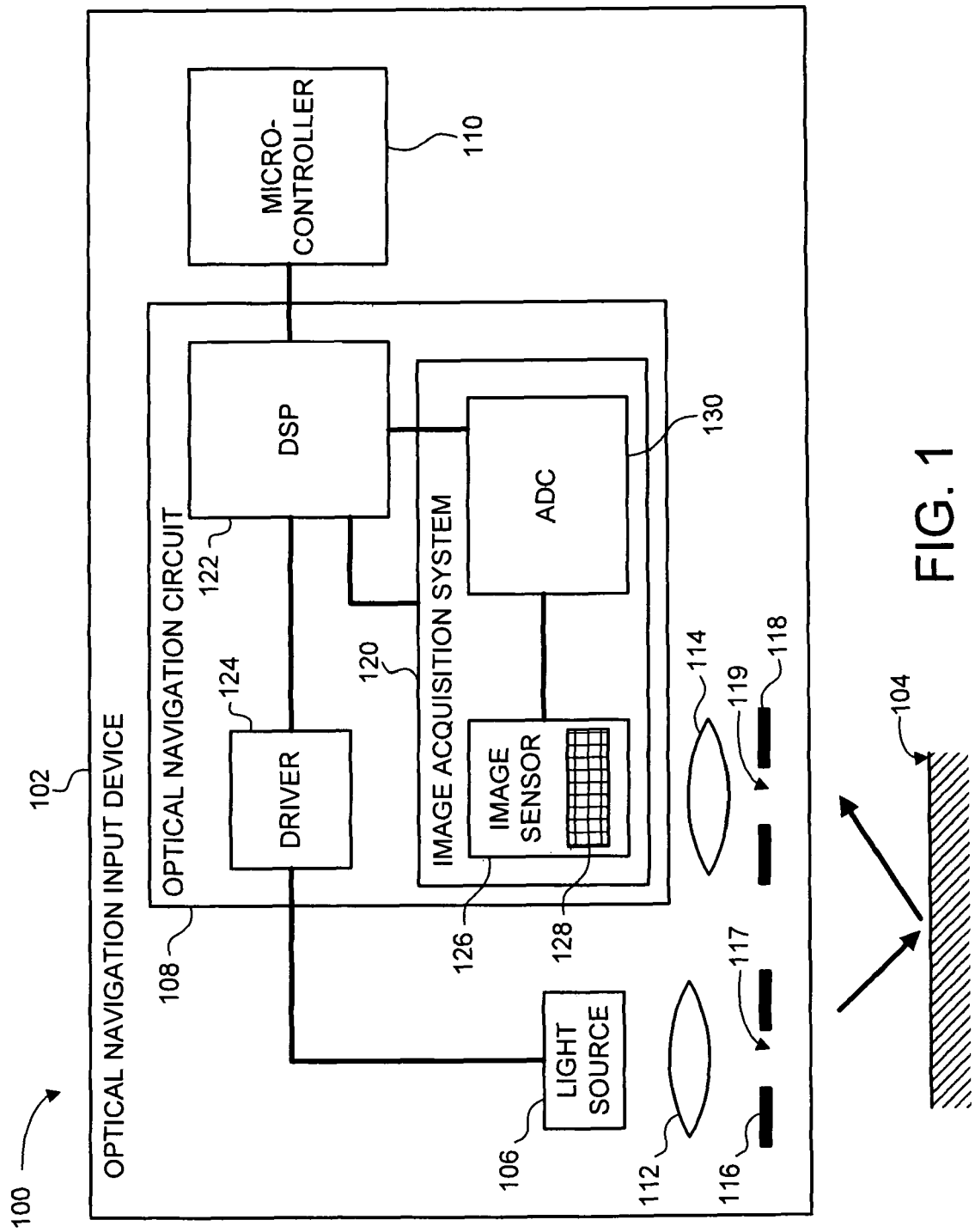
FIG. 1 depicts a schematic block diagram of one embodiment of an optical navigation system.

FIG. 1 depicts a schematic block diagram of one embodiment of an optical navigation system 100. The illustrated optical navigation system 100 includes an optical navigation input device 102 and an illumination surface 104. In general, the optical navigation input device 102 illuminates portions of the illumination surface 104 in order to generate optical images of the illuminated portions or features at the illumination surface 104. More specifically, the optical navigation input device 120 moves relative to the illumination surface 104 and generates one or more navigation signals representative of the movement of the optical navigation input device 102 relative to the illumination surface 104. Hence, the illumination surface 104 also may be referred to as a navigation surface. Additionally, since the illumination surface 104 is used to track the movement of the optical navigation input device 102, the illumination surface 102 also may be referred to as a tracking surface.

In order to illuminate the illumination surface 104, the optical navigation input device 102 emits a light beam which is at least partially reflected by the illumination surface 104. The optical navigation device 102 detects the reflected light beam and processes the reflected light beam to generate the navigation signals. Examples of how the navigation signals may be generated are described in more detail below.

The illumination surface 104 may be any type of surface and may include one or more types of material compositions. Examples of typical illumination surfaces 104 include wood, stone, or plastic laminate desktops, as well as fabric or other textured navigation pads (e.g., a mouse pad). Some types of illumination surfaces 104 are highly specular so that substantially all of the light incident on the illumination surface 104 is specularly reflected and not diffusely scattered in other directions. One example of a highly specular illumination surface 104 is a glass surface. Other embodiments may include other types of specular illumination surfaces.

The distance between the optical navigation input device 102 and the illumination surface 104 may vary depending on the application for which the optical navigation input device 102 is used. In surface navigation applications, the optical navigation input device 102 may be relatively close to the illumination surface 104. For example, a housing of the optical navigation input device 102 may be in direct, physical contact with the illumination surface 104. Alternatively, stand-off structures (not shown) attached to the housing of the optical navigation input device 102 may be in direct, physical contact with the illumination surface 104. In other embodiments, the optical navigation input device 102 may be within a few centimeters or inches of the illumination surface 104, without being in direct, physical contact with the illumination surface 104. In contrast, in free space navigation applications, the optical navigation input device 102 may be relatively far from the illumination surface 104. For example, the optical navigation input device 102 may operate outside of the surface navigation optical range.

The depicted optical navigation input device 102 includes a light source 106, an optical navigation circuit 108, and a microcontroller 110. The optical navigation input device 102 also includes optical elements 112 and 114, an illumination aperture structure 116 which defines an illumination aperture 117, and an imaging aperture structure 118 which defines and imaging aperture 119. Other embodiments may include fewer or more components. For example, some embodiments of the optical navigation input device 102 may exclude one or more of the optical elements 112 and 114.

In one embodiment, the light source 106 is a light emitting diode (LED). In another embodiment, the light source 106 is a laser. For example, the light source 106 may be a vertical cavity surface emitting laser (VCSEL). Alternatively, the light source 106 may be another type of laser or other light source.

In general, the light source directs a light beam toward the illumination surface 104 to illuminate a primary illumination spot at the illumination surface 104. If the illumination surface 104 is substantially specular, then the light beam reflects off of the illumination surface 104 along a specular reflection path. The incident light beam (i.e., the light traveling toward the illumination surface 104) may pass through the optical element 112 and the illumination aperture 117 formed by the illumination aperture structure 116. Similarly, the reflected light beam (i.e., the light reflected from the illumination surface 104) may pass through the imaging aperture 119, formed by the imaging aperture structure 118, and then pass through the optical element 114. Specific functionality of the optical elements 112 and 114 and apertures 117 and 118 is described in more detail below with reference to FIG. 2.

If there are any surface reflection features such as dust or scratches at the illumination surface 102, then some of the incident light may be reflected and scattered along one or more scattered light paths which are offset from the specular reflection path. Essentially, any path which is not the specular reflection path may be considered a scattered light path. In the case of diffuse reflection off of a surface reflection feature, the reflected light may be diffused, or scattered in substantially all directions. Although there may be many types of surface reflection features which scatter the reflected light in different directions, some examples of surface reflection features include particles (e.g., dust) on the illumination surface 104, aberrations (e.g., scratches) in the illumination surface 104, as well as imperfections below or beneath the illumination surface 104.

The depicted optical navigation circuit 108 includes an image acquisition system (IAS) 120, a digital signal processor (DSP) 122, and a driver 124. In one embodiment, the driver 124 of the optical navigation circuit 108 controls the operation of the light source 106 (e.g., using a driver signal) to generate the light beam that is emitted toward the illumination surface 104. As described above, the reflected light beam, or a portion thereof, is then received by the image acquisition system 120.

The depicted image acquisition system 120 includes an image sensor 126 and an analog-to-digital converter (ADC) 130. The image sensor 126 includes a pixel array 128. In one embodiment, the navigation sensor 126 generates a plurality of electrical signals corresponding to reflected light at the pixel array 128. Each of the electrical signals corresponds to one of the picture elements (or pixels) of the pixel array 128. In one embodiment, each pixel is a photosensor or other photosensitive device. At least a portion of the light beam reflected from the illumination surface 104 is incident on the pixel array 128. In one embodiment, the optical element 114 facilitates resolution of microscopic surface images at the pixel array 128. Alternatively, the optical element 114 facilitates resolution of more distant objects in a free space navigation environment.

The analog-to-digital converter (ADC) 130 converts the plurality of electrical signals, received from the pixel array 128 of the navigation sensor 126, from analog signals to digital signals. The analog-to-digital converter 130 then passes the digital signals to the digital signal processor 122.

After the digital signal processor 122 receives the digital form of the electrical signals from the analog-to-digital converter 130 of the image acquisition system 120, the digital signal processor 122 may perform additional processing using the digital signals. The digital signal processor 122 then transmits one or more signals to the microcontroller 110. Examples of types of signals transmitted from the digital signal processor 122 of the optical navigation circuit 108 to the microcontroller 110 include channel quadrature signals based on Δx and Δy relative displacement values. These signals, or other signals, may be indicative of a movement of the optical navigation input device 102 relative to the illumination surface 104.

Alternatively, the quadrature or other signals may be indicative of a movement of the optical navigation input device 102 relative to a distant object or surface in a free space navigation environment. Other embodiments of the digital signal processor 122 may transmit other types of signals to the microcontroller 110. In one embodiment, the microcontroller 110 implements a variety of functions, including transmitting data to and receiving data from a host computer system (not shown).

Figure 2:
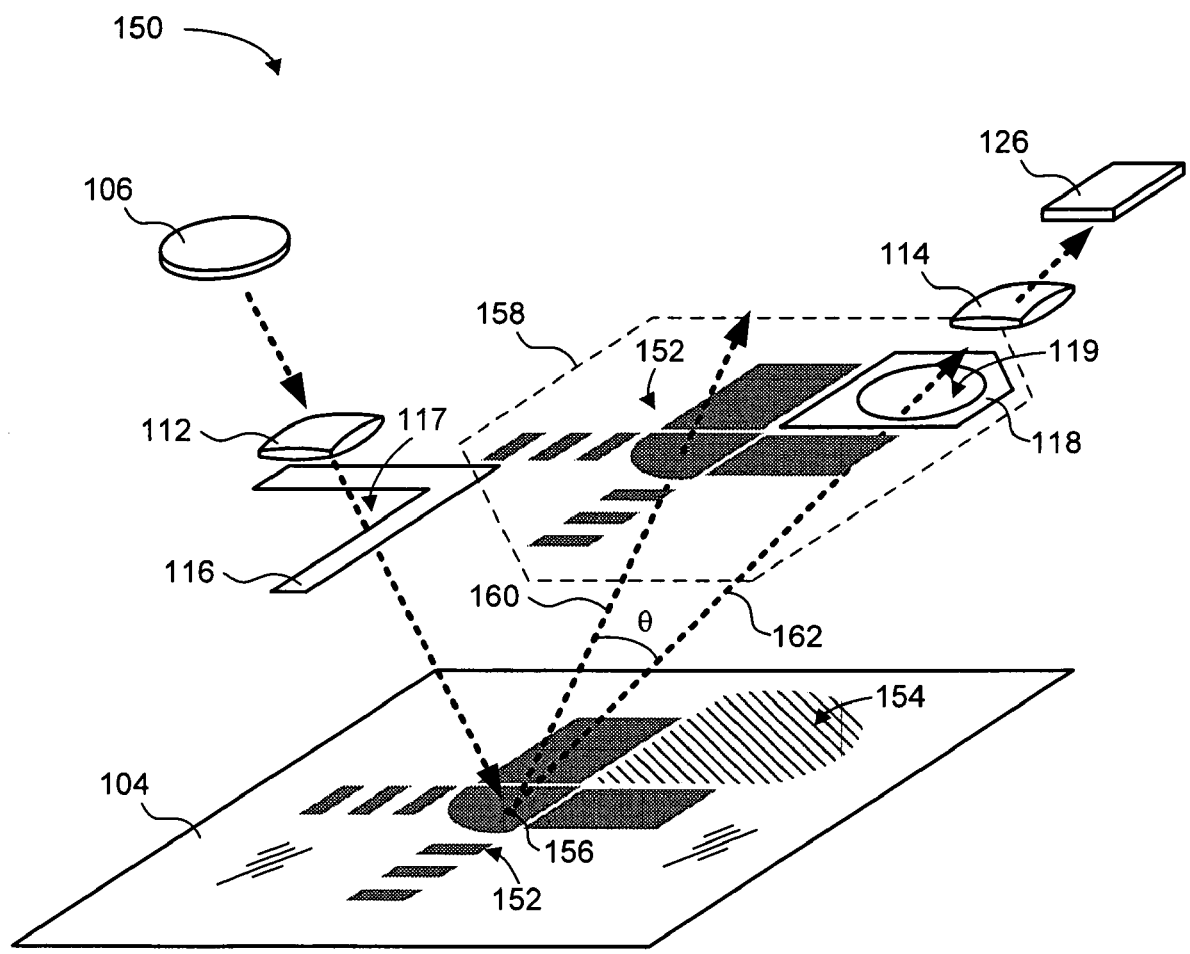
FIG. 2 depicts a perspective view of another embodiment of an optical navigation input device relative to the illumination surface.

FIG. 2 depicts a perspective view of another embodiment of an optical navigation input device 150 relative to the illumination surface 104. The illustrated optical navigation input device 150 of FIG. 2 includes many of the same or similar components as shown in the optical navigation input device 102 of FIG. 1. Hence, the same or similar components are identified with the same numeric designations.

The illustrated optical navigation input device 150 includes the light source 106, the optical element 112, and the illumination aperture structure 116 which defines the illumination aperture 117. The optical navigation input device 150 also includes the imaging aperture 118 structure which defines the imaging aperture 119. The optical navigation input device 150 also includes the optical element 114 and the image sensor 126. Other embodiments of the optical navigation input device 150 may include fewer or more components to implement less or more functionality.

For reference in describing certain functionality of embodiments of the optical navigation input device 150, FIG. 2 also depicts a diffraction pattern projected on the illumination surface 104, a diffraction discontinuity area 154 of the diffraction pattern 152, and a surface reflection feature 156 (e.g., a dust particle or scratch) at the illumination surface 104. Additionally, FIG. 2 shows a representation of an imaging plane 158 at which the imaging aperture structure 118 and the imaging aperture 119 are located. The diffraction pattern 152 is also illustrated at the imaging plane 158, for ease of reference in describing the location of the imaging aperture 119 relative to the diffraction pattern 152 and the diffraction discontinuity area 154. Furthermore, FIG. 2 illustrates the specular reflection path 160 and a scattered reflection path 162. The scattered light path 162 is offset from the specular reflection path 160 by an angle, θ.

In one embodiment, light from the light source 106 is directed toward the optical element 112. The optical element 112 represents a collimating lens structure interposed between the light source 106 and the illumination surface 104. The collimating lens structure includes at least one optical lens to collimate the light beam. The collimating lens structure also directs the light beam through the illumination aperture 117 to the illumination surface 104.

In one embodiment, the illumination aperture structure 116 at least partially defines the illumination aperture 117. More specifically, the illumination aperture structure 116 may define two or more sides of the illumination aperture 117. The illumination aperture 117 is interposed between the light source 106 and the illumination surface 104. The illumination aperture 117 is also interposed between the optical element 112 and the illumination surface 104. As a result, the optical element 112 is interposed between the light source 106 and the illumination aperture 117.

In general, the illumination aperture 117 produces the diffraction pattern 152 relative to the light beam. The shape and distribution of the diffraction pattern 152 depends on the size, shape, and location of the illumination aperture 117 relative to the size, shape, and location, of the light beam. In one embodiment, the resulting diffraction pattern 152 includes a diffraction discontinuity which is substantially free from diffracted light within a sector area outside of the light beam. The indicated diffraction discontinuity area 154 (indicated by the hatch pattern) is one example of a diffraction discontinuity of the diffraction pattern 152. Although a single diffraction discontinuity is identified in the figure, some embodiments of the illumination aperture 117 may have more than one diffraction discontinuity.

In one embodiment, the location of the diffraction discontinuity corresponds to a specific geometrical configuration of the illumination aperture 117. As one example, the location of the diffraction discontinuity may correspond to a corner in the illumination aperture 117 where two sides of the illumination aperture 117 meet at a non-zero angle. The geometrical configuration of the two sides meeting at a non-zero angle forms a corner, or apex, of the illumination aperture 117. As one example of a shape of the illumination aperture structure 116 which defines the illumination aperture 117, the illumination aperture structure 116 may be a substantially opaque L-shaped structure to clip two sides of the light beam. In this embodiment, the illumination aperture 117 is not fully circumscribed by the illumination aperture structure 116. However, other embodiments of the illumination aperture structure 116 may fully circumscribe the illumination aperture 117. Additionally, other embodiments may have other linear, multi-linear, curvilinear, or non-linear, shapes to define other corners, apexes, or geometrical characteristics of the illumination aperture 117 to define a different diffraction pattern 152 with at least one diffraction discontinuity.

Figure 5:
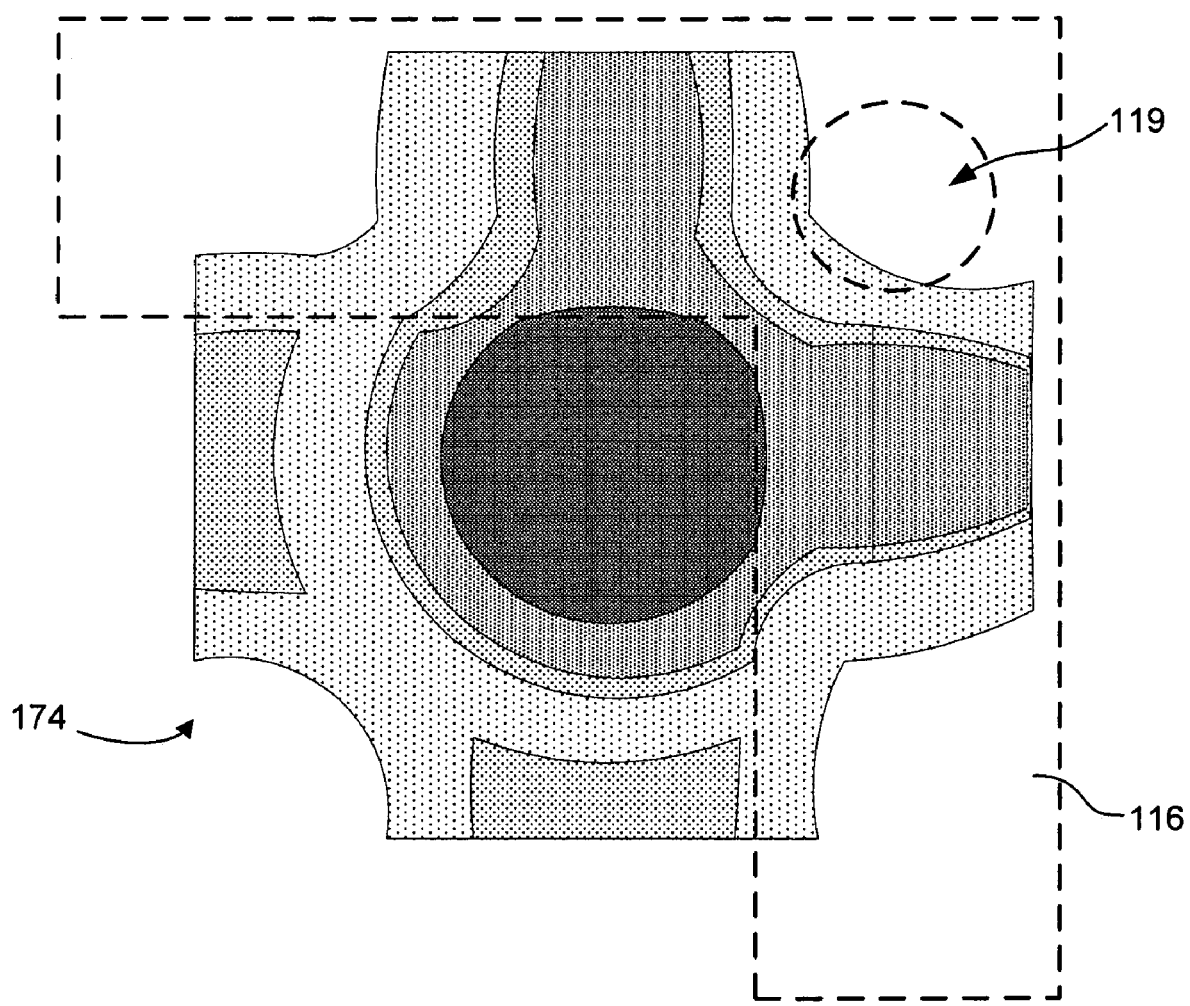
FIG. 5 depicts a stylized cross-sectional view of the light beam pattern at the illumination surface due to diffraction by the illumination aperture of FIG. 2.

The location of the diffraction discontinuity also corresponds to the location of the imaging aperture 119, in some embodiments. In this way, the diffraction pattern 152 resulting from the light beam passing through the illumination aperture 117 is substantially directed away from the imaging aperture 119. One example of this alignment of the diffraction pattern 152 and the imaging aperture 119 is shown in FIG. 5 and described in more detail below.

By aligning the components of the optical navigation input device 150 so that the imaging aperture 119 is aligned with the diffraction discontinuity area 154 of the diffraction pattern 152, the imaging aperture 119 is disposed within a scattered light path 162 which is offset from the specular reflection path 160. In some embodiments, the scattered light path 162 is offset from the specular reflection path 160 of the light beam by less than about 15 degrees. In other embodiments, the scattered light path 162 is offset from the specular reflection path 160 of the light beam by about 5 to 10 degrees. Other embodiments may use other offset angles which are greater than about 15 degrees or less than about 5 degrees.

In one embodiment, the imaging aperture structure 118 defines the imaging aperture 119 disposed within the scattered light path 162. This location allows the imaging aperture 119 to receive the scattered light from the surface reflection feature 156 and to direct at least a portion of the scattered light to the image sensor 126.

In one embodiment, the optical element 114 is an imaging lens structure disposed within the scattered light path 162 and interposed between the imaging aperture 119 and the image sensor 126. The imaging lens structure includes at least one optical element to direct the scattered light to the image sensor 126.

In one embodiment, the image sensor 126 is also disposed within the scattered light path 126 at a location corresponding to the diffraction discontinuity. The image sensor 126 receives the scattered light from the surface reflection feature 156 and generates a navigation image of the surface reflection feature 156. The navigation image may be used to generate one or more navigation signals, as described above with reference to the description of FIG. 1.

Figure 3:
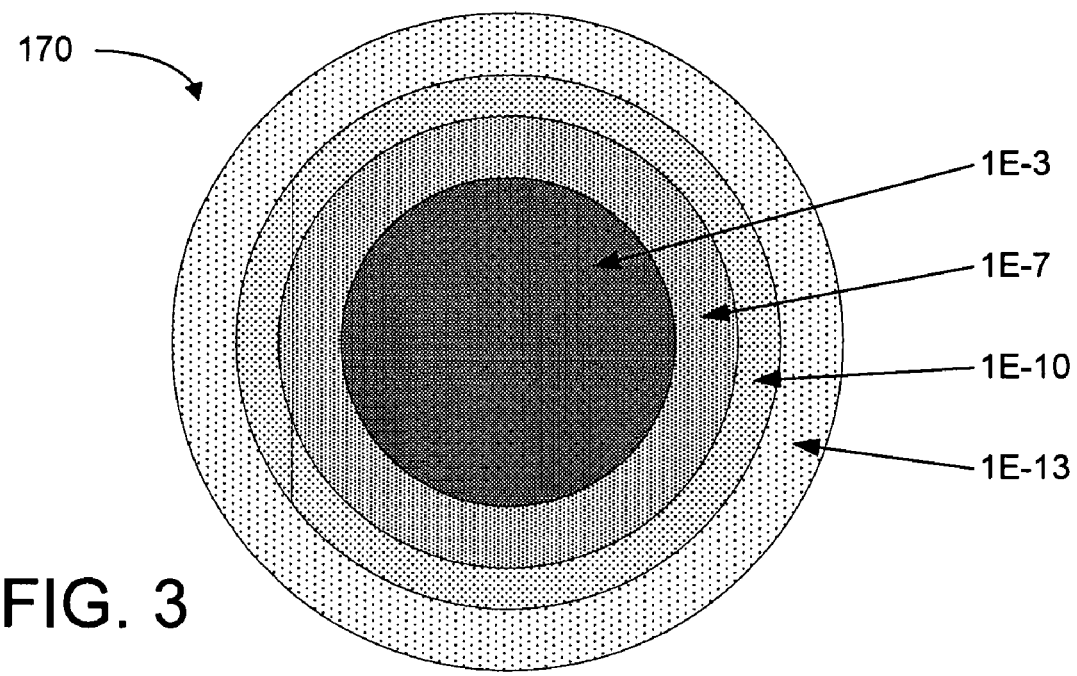
FIG. 3 depicts a stylized cross-sectional view of one embodiment a light beam from the light source of the optical navigation input device of FIG. 2.

FIG. 3 depicts a stylized cross-sectional view of one embodiment a light beam 170 from the light source 106 of the optical navigation input device 102 of FIG. 2. The beam intensity of the light beam 170 is shown logarithmically by the concentric circles with different shading densities. The intensity at the center of the light beam 170 is approximately $1 \times 10^{-3}$ W/m$^2$. The first concentric ring around the center of the light beam 170 represents a portion of the light beam 170 which has an intensity of approximately $1 \times 10^{-7}$ W/m$^2$. Similarly, the second and third concentric rings of the light beam 170 represent portions of the light beam 170 which have intensities of approximately $1 \times 10^{-10}$ W/m$^2$ and $1 \times 10^{-13}$ W/m$^2$, respectively. Although other intensity levels are not explicitly designated in the figure, the intensity profile or distribution of the light beam 170 logarithmically varies from the intensity at the center of the light beam 170 to a substantially lower intensity at the periphery of the light beam 170. Thus, the change in light intensity over the radius of the light beam 170 may be more gradual than depicted in the figure.

Figure 4:
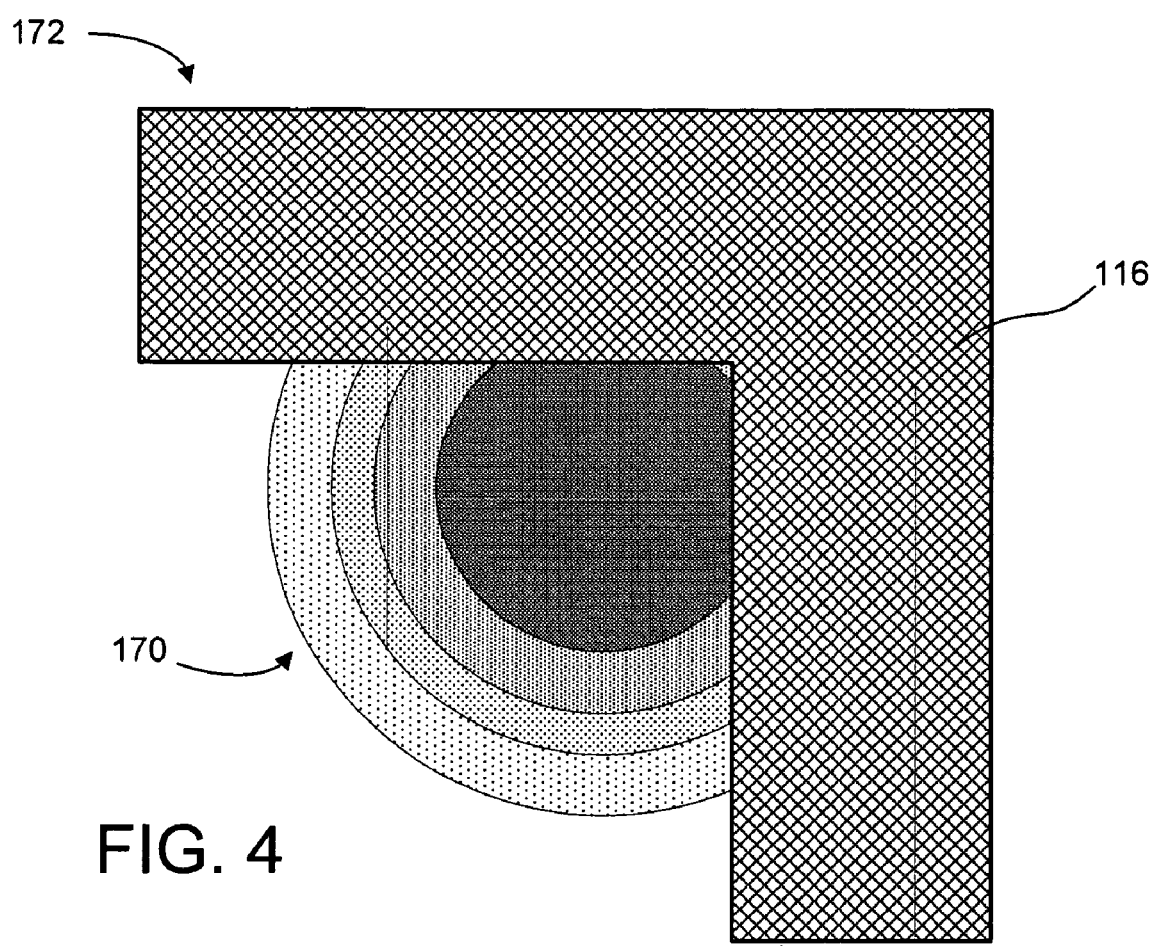
FIG. 4 depicts a schematic diagram of one embodiment of an alignment position of the illumination aperture structure of FIG. 2 relative to the light beam of FIG. 3.

FIG. 4 depicts a schematic diagram of one embodiment of an alignment position 172 of the illumination aperture structure 116 of FIG. 2 relative to the light beam 170 of FIG. 3. In the illustrated embodiment, the illumination aperture structure 116 defines a corner of the illumination aperture 117. The illumination aperture 117 is positioned so that the center portion of the light beam 170 passes through the illumination aperture 117 near the corner, which may be defined by two sides of a polygon shape which meet at a non-zero angle. In this way, the illumination aperture 117 is aligned relative to the light beam 170 to clip two sides of the light beam 170 using the at least two sides of the illumination aperture structure 116. Hence, the illumination aperture 117 also may be referred to as an asymmetrical clipping aperture since the illumination aperture 117 asymmetrically clips one or more portions of the light beam 170.

In the illustrated embodiment, the illumination aperture structure 116 is an L-shaped illumination aperture structure. Essentially, the L-shaped illumination aperture structure performs like an infinite square aperture which is shifted so that the edges of the illumination aperture structure 116 are at a specified distance from the center of the light beam 170. In one embodiment, the edges of the illumination aperture are about 0.8 mm from the center of the light beam 170, for a beam size of 1.5 mm at the $1/e^2$ intensity level, so that only light which is below an intensity threshold is blocked. For example, the illumination aperture structure 116 may block light which is no more than 3% of the maximum intensity of the light beam 170. Other embodiments may use a different intensity threshold. This does not mean that the illumination aperture structure 170 blocks all light which has an intensity below the intensity threshold, but means that no light above the intensity threshold is blocked. Thus, some light below the intensity threshold might pass through the illumination aperture 117, and no light above the intensity is blocked by the illumination aperture structure 117. By only blocking light below the intensity threshold, the uniformity of the central portion of the light beam 170 can be maintained, which may facilitate relatively more intense illumination of the illumination surface 104 and a relatively higher intensity of the light scattered along the scattered light path by the surface reflection feature 156.

FIG. 5 depicts a stylized cross-sectional view of the light beam pattern 174 at the illumination surface 104 due to diffraction by the illumination aperture 117 (shown dashed) of FIG. 2. More specifically, FIG. 5 shows a stylized prediction of the beam profile after it propagates to the plane of the imaging aperture 119. Note that the illumination aperture structure 116 is not necessarily in the same plane as the imaging aperture 119, but the illumination aperture structure 116 is also shown for reference relative to the diffraction pattern of the light beam 170. In the depicted embodiment, the diffraction pattern is directed substantially away from the location of the imaging aperture 119 because the light beam pattern 174 (including the diffraction pattern) is not circularly symmetric, or concentric, around the central portion of the light beam 170. Rather, the diffraction pattern is predominantly directed away from the imaging aperture 119. However, some of the diffracted light nevertheless may be present at the location of the imaging aperture 119, although the amount of diffracted light at the imaging aperture 119 can be relatively small depending on the shape and location of the illumination aperture 117.

Figure 6:
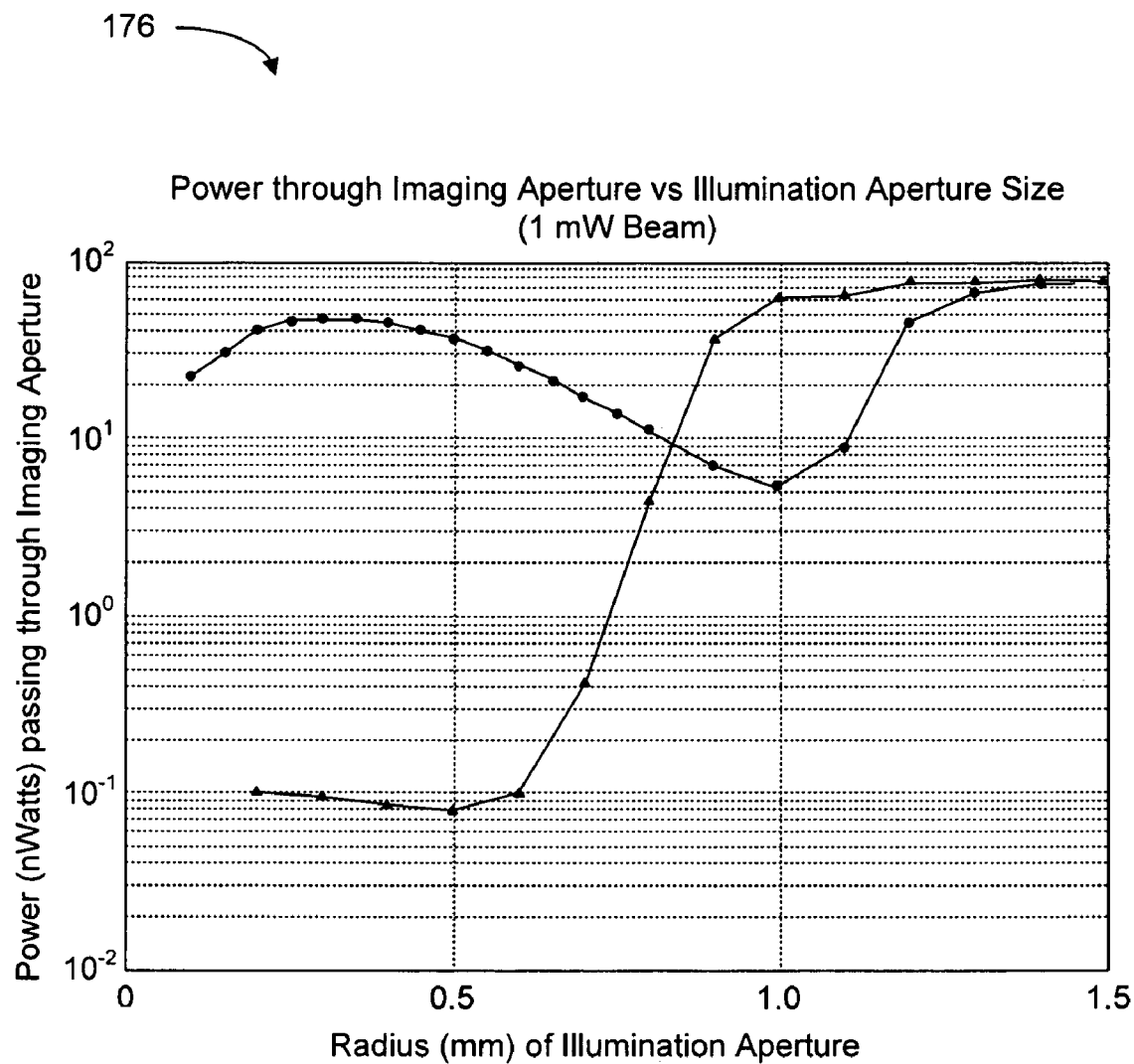
FIG. 6 depicts a graph of one embodiment of a relationship between power of the light passing through the imaging aperture of FIG. 2 relative to a size of the illumination aperture of FIG. 2.

FIG. 6 depicts a graph 176 of one embodiment of a relationship between power of the light passing through the imaging aperture 119 of FIG. 2 relative to a size of the illumination aperture 117 of FIG. 2. In particular, the upper line, with circular data points, represents the amount of light passing through the imaging aperture 119 using conventional technology (e.g., a circular illumination aperture). In comparison, the lower line, with triangular data points, represents the amount of light passing through the imaging aperture 119 using an embodiment of the asymmetrical clipping aperture, or the offset illumination aperture 119, which is described herein.

For clarification, it should be noted that both the illumination aperture 117 and the imaging aperture 119 may be referred to as offset apertures. However, while both types of apertures are offset relative to specific reference points, the illumination aperture 117 and the imaging aperture 119 are each offset relative to a different reference point. The illumination aperture 117 is offset relative to the central portion of the light beam 170, so that the illumination aperture structure 116 clips, for example, two sides of the light beam 170. In contrast, the imaging aperture 119 is offset relative to the specular reflection path 160, so that the imaging aperture 119 receives scattered light rather than specularly reflected light. Thus, both the illumination aperture 117 and the imaging aperture 119 may be characterized as offset apertures, but the reference point for each type of aperture is not necessarily the same.

From the graphical data shown in FIG. 6, it can be seen that at least some embodiments of the optical navigation input device 102 using the offset illumination aperture 117 can result in a diffraction pattern which causes less power, or intensity, of the light to be present at the imaging aperture 119. The power, or intensity, of the diffracted light that reaches the image sensor 126 can cause noise in the image generated by the image sensor 126. Hence, the signal-to-noise ratio (SNR) of the scattered light signal available at the image sensor 126 can be improved by reducing the power, or intensity, of the diffracted light at the imaging aperture 119. In some embodiments, the noise level at the imaging aperture 119 is at least two levels of magnitude less when compared with conventional optical navigation input devices which use a circular illumination aperture.

It should also be noted that the shape of the illumination aperture 117 is not necessarily round, even though FIG. 6 references a "radius" of the illumination aperture 117. The "radius" designation is merely representative of the size of the offset illumination aperture 117. In one embodiment, the "radius" of the illumination aperture 117 relates to the distance from the center of the light beam 170 to the nearest edge of the illumination aperture structure 116 (e.g., for an infinite square aperture). In some embodiment, the distance from the center of the light beam to the nearest edge of the illumination aperture structure 116 is approximately 0.5 mm, which results in a power of about 0.07 nW. A conventional implementation which uses a circular illumination aperture of about the same size results in a power of about 5.5 nW and, hence, has a much lower SNR.

Figure 7:
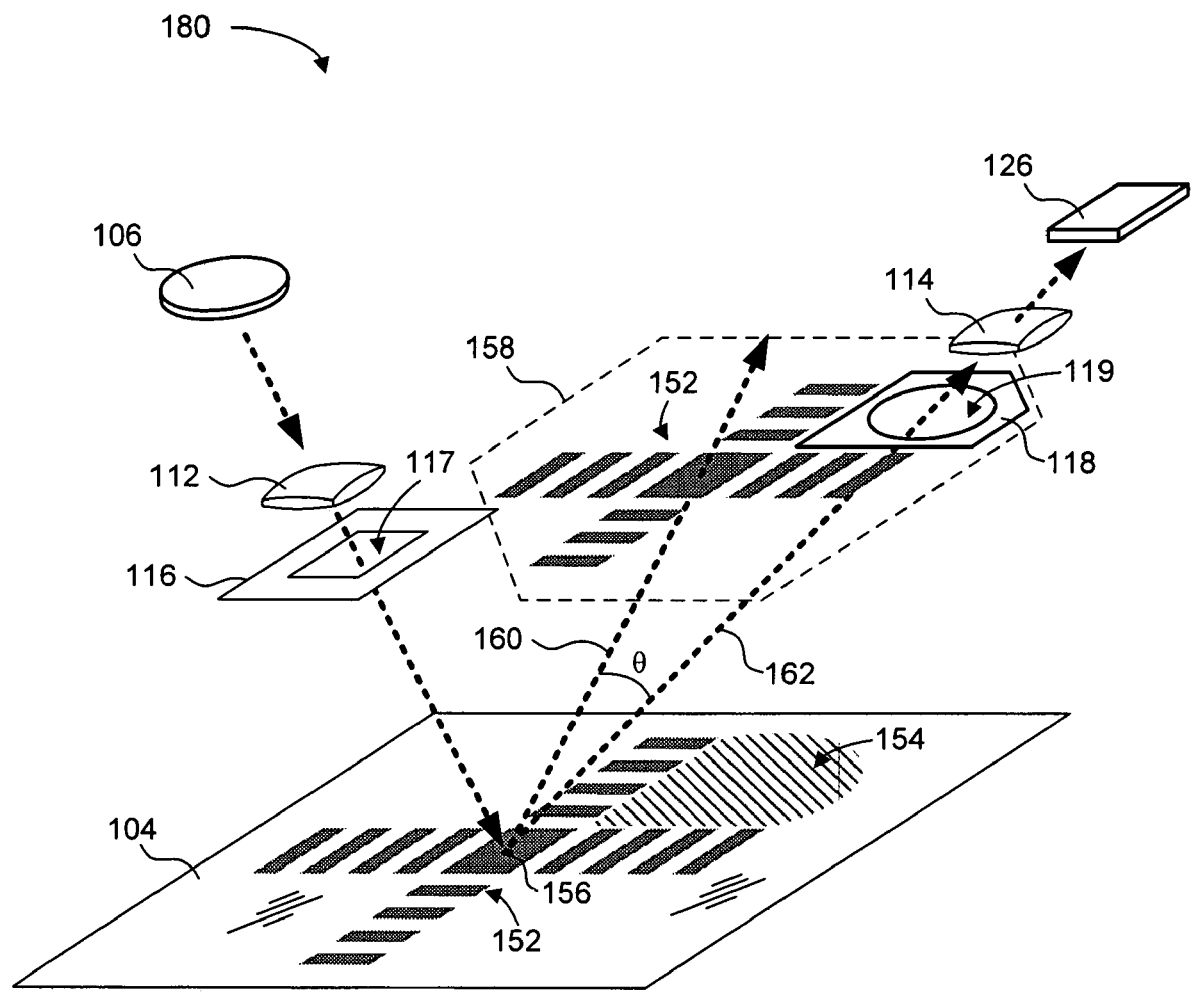
FIG. 7 depicts a perspective view of another embodiment of an optical navigation input device relative to the illumination surface.

FIG. 7 depicts a perspective view of another embodiment of an optical navigation input device 180 relative to the illumination surface 104. The illustrated optical navigation input device 180 of FIG. 7 is substantially similar to the optical navigation input device 150 of FIG. 2. The difference between the illustrated devices is the shape of the illumination aperture structure 116, and the resulting shape of the illumination aperture 117. In FIG. 7, the illumination aperture structure 116 fully circumscribes the illumination aperture 117. In contrast, the illumination aperture structure 116 shown in FIG. 2 does not fully circumscribe the illumination aperture 117.

In some embodiments, the illumination aperture structure 116 defines the illumination aperture 117 as a quadrilateral which is larger in area than a cross-section of the light beam 170. Also, the illumination aperture 117 may be offset relative to the light beam 170 to clip at least two sides of the light beam 170 using corresponding sides of the illumination aperture structure 116. Alternatively, more than two sides of the illumination aperture structure 116 may clip the light beam 170. Additionally, some embodiments of the illumination aperture structure 116 may have fewer or more sides, so that the shape of the illumination aperture 117 is other than a quadrilateral with four sides.

FIG. 8 depicts a schematic flow chart diagram of one embodiment of a method 190 for operating an optical navigation input device 102. Although the method 190 is described in conjunction with the optical navigation input device 102 of FIG. 1, the method 190 may be implemented with other embodiments of the optical navigation input device 102 such as the optical navigation input device 150 of FIG. 2 or the optical navigation input device 180 of FIG. 7.

In the depicted method 190, at block 192 the light source 106 emits a light beam 170 through the asymmetrical clipping aperture (i.e., the illumination aperture 117). As explained above, the asymmetrical clipping aperture is at least partially defined by the illumination aperture structure 116. The portion of the light beam 170 that passes through the asymmetrical clipping aperture illuminates the illumination surface 104. The illumination aperture structure 116 clips the light beam 170 and, thereby, produces a diffraction pattern which includes a diffraction discontinuity. As explained above, the diffraction discontinuity is the area 154 which is substantially free from diffracted light surrounding the primary illumination spot corresponding to the light beam 170.

At block 194, scattered light which reflects off of the surface reflection feature 156 passes through the imaging aperture 117. The imaging aperture 117 is defined by the imaging aperture structure 118, as explained above. In particular, the imaging aperture structure 118 is mounted within the scattered light path 162, whereas the illumination aperture structure 116 is mounted within the path of the incident light beam 170. The imaging aperture structure 118 defines the imaging aperture 119 at a location corresponding to the diffraction discontinuity, outside of the specular reflection path 160, to receive scattered light substantially outside of the diffracted light pattern.

In some embodiments, mounting the illumination aperture structure 116 further includes offsetting a substantially opaque L-shaped structure, as shown in FIG. 2, to clip two sides of the light beam 170. In other embodiments, mounting the illumination aperture structure 116 includes aligning the asymmetrical clipping aperture to block peripheral portions of the light beam 170 while maintaining a uniformity of a central portion of the light beam 170, as shown in FIG. 4.

The image sensor 126 receives the scattered light and, at block 196 uses the scattered light to generate one or more navigation images of the surface reflection feature 156. Using the navigation images produced by the image sensor 126, the optical navigation input device 102 can generate navigation signals to indicate a direction of movement of the optical navigation input device 102 relative to the illumination surface 104.

Embodiments of the illustrated method 190 facilitate using an offset illumination aperture 117 to realize compact laser mice or other optical navigation input devices. The light received at the offset angle, θ, (e.g., 5-10 degrees off axis from the specular reflection path 160) is captured using the offset imaging aperture 119 and the pixel array 128 of the image sensor 126 of the laser mice. The output from the image sensor 126 helps in determining and tracking the motion of the laser mice relative to the smooth and specular illumination surface 104. Other embodiments may facilitate additional functionality in laser mice or other optical navigation input devices.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An optical navigation input device comprising:
a light source to direct a light beam toward a substantially specular illumination surface to illuminate a primary illumination spot at the illumination surface, wherein the light beam reflects off of the illumination surface along a specular reflection path, and scattered light reflects off of a surface reflection feature along a scattered light path which is offset from the specular reflection path;
an illumination aperture structure to at least partially define an illumination aperture interposed between the light source and the illumination surface, the illumination aperture to produce a diffraction pattern relative to the light beam, wherein the diffraction pattern comprises a diffraction discontinuity which is substantially free from diffracted light within a sector area outside of the light beam; and
an image sensor disposed within the scattered light path at a location corresponding to the diffraction discontinuity, wherein the image sensor is configured to receive the scattered light from the surface reflection feature and to generate a navigation image of the surface reflection feature.

2. The optical navigation input device of claim 1, further comprising an imaging aperture structure to define an imaging aperture disposed within the scattered light path, wherein the imaging aperture is configured to pass at least a portion of the scattered light to the image sensor.

3. The optical navigation input device of claim 2, further comprising an imaging lens structure disposed within the scattered light path and interposed between the imaging aperture and the image sensor, wherein the imaging lens structure comprises at least one optical element to direct the scattered light to the image sensor.

4. The optical navigation input device of claim 1, further comprising a collimating lens structure interposed between the light source and the illumination aperture, wherein the collimating lens structure comprises at least one optical element to direct the light beam through the illumination aperture to the illumination surface.

5. The optical navigation input device of claim 1, wherein the illumination aperture structure defines the illumination aperture with at least two sides which meet at a non-zero angle to form a corner in the illumination aperture.

6. The optical navigation input device of claim 5, wherein the illumination aperture is aligned relative to the light beam to clip at least two sides of the light beam using the at least two sides of the illumination aperture structure.

7. The optical navigation input device of claim 5, wherein the illumination aperture structure defines the illumination aperture as a quadrilateral which is larger in area than a cross-section of the light beam, and wherein the illumination aperture is offset relative to the light beam to clip at least two sides of the light beam using corresponding sides of the illumination aperture structure.

8. The optical navigation input device of claim 1, wherein the light source comprises a laser light source.

9. The optical navigation input device of claim 1, wherein the scattered light path is offset from the specular reflection path of the light beam by less than about 15 degrees.

10. The optical navigation input device of claim 1, wherein the scattered light path is offset from the specular reflection path of the light beam by about 5 to 10 degrees.

11. An optical navigation input device comprising:
a light source to direct a light beam toward a substantially specular illumination surface, wherein the light beam reflects off of the illumination surface along a specular reflection path, and scattered light reflects off of a surface reflection feature along a scattered light path which is offset from the specular reflection path;
an imaging aperture structure to define an imaging aperture disposed within the scattered light path, wherein the imaging aperture is configured to receive the scattered light from the surface reflection feature and to direct at least a portion of the scattered light to an image sensor; and
an illumination aperture structure to at least partially define an illumination aperture interposed between the light source and the illumination surface, wherein the illumination aperture structure is offset relative to the light beam to clip the light beam and produce a diffraction pattern which is substantially directed away from the imaging aperture.

12. The optical navigation input device of claim 11, wherein the image sensor is disposed within the scattered light path to receive the scattered light through the imaging aperture and to generate a navigation image of the surface reflection feature.

13. The optical navigation input device of claim 12, wherein the illumination aperture structure defines the illumination aperture comprising a corner where two sides meet at a non-zero angle, wherein the corner of the illumination aperture is configured to produce a diffraction discontinuity within the diffraction pattern, wherein the diffraction discontinuity is substantially free from diffracted light.

14. The optical navigation input device of claim 12, further comprising an imaging lens structure disposed within the scattered light path and interposed between the imaging aperture and the image sensor, wherein the imaging lens structure comprises at least one optical element to direct the scattered light to the image sensor.

15. The optical navigation input device of claim 14, further comprising a collimating lens structure interposed between the light source and the illumination aperture, wherein the collimating lens structure comprises at least one optical element to direct the light beam through the illumination aperture to the illumination surface.

16. The optical navigation input device of claim 15, wherein the illumination aperture structure defines the illumination aperture as a polygon shape with at least two sides which meet at a non-zero angle, wherein the two sides are aligned to clip the light beam and produce the diffraction pattern, wherein the diffraction pattern comprises a diffraction discontinuity which is substantially free from diffracted light within a sector area outside of the light beam.

17. The optical navigation input device of claim 11, wherein the light source comprises a vertical cavity surface emitting laser (VCSEL).

18. A method for operating an optical navigation input device, the method comprising:
emitting a light beam through an asymmetrical clipping aperture at least partially defined by an illumination aperture structure to illuminate an illumination surface, the illumination aperture structure to clip the light beam and produce a diffraction pattern, wherein the diffraction pattern comprises a diffraction discontinuity which is substantially free from diffracted light within a sector area outside of the light beam;
passing scattered light through an imaging aperture defined by an imaging aperture structure, wherein the imaging aperture structure defines the imaging aperture at a location corresponding to the diffraction discontinuity substantially outside of a specular reflection path; and
generating a navigation image based on the scattered light.

19. The method of claim 18, further comprising clipping two sides of the light beam based on an offset location of the illumination aperture structure relative to the light beam.

20. The method of claim 18, further comprising blocking peripheral portions of the light beam while maintaining a uniformity of a central portion of the light beam.

* * * * *